United States Patent
Deshpande

(10) Patent No.: US 7,779,146 B2
(45) Date of Patent: Aug. 17, 2010

(54) METHODS AND SYSTEMS FOR HTTP STREAMING USING SERVER-SIDE PACING

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 578 days.

(21) Appl. No.: 11/832,591

(22) Filed: Aug. 1, 2007

(65) Prior Publication Data

US 2008/0114889 A1    May 15, 2008

Related U.S. Application Data

(60) Provisional application No. 60/865,150, filed on Nov. 9, 2006.

(51) Int. Cl.
*G06F 15/16* (2006.01)

(52) U.S. Cl. .................. 709/233; 709/231; 709/232; 709/234

(58) Field of Classification Search .......... 709/231–234
See application file for complete search history.

(56) References Cited

U.S. PATENT DOCUMENTS

| 6,182,127 | B1 | 1/2001 | Cornin, III et al. | |
| 6,418,473 | B1* | 7/2002 | St. Maurice et al. | 709/231 |
| 7,000,025 | B1* | 2/2006 | Wilson | 709/235 |
| 7,039,717 | B2* | 5/2006 | Johnson | 709/237 |
| 7,508,760 | B2* | 3/2009 | Akiyama et al. | 370/232 |
| 2001/0032238 | A1 | 10/2001 | Cornin, III et al. | |
| 2002/0078164 | A1* | 6/2002 | Reinschmidt | 709/217 |
| 2002/0112057 | A1* | 8/2002 | Srinivas et al. | 709/226 |
| 2002/0116500 | A1* | 8/2002 | Arora et al. | 709/227 |
| 2003/0002508 | A1* | 1/2003 | Dierks et al. | 370/395.52 |
| 2003/0041118 | A1 | 2/2003 | Elnozahy et al. | |
| 2004/0031054 | A1 | 2/2004 | Dankworth et al. | |
| 2005/0078193 | A1* | 4/2005 | Ing et al. | 348/222.1 |
| 2005/0213569 | A1* | 9/2005 | Kajiwara | 370/356 |
| 2008/0022005 | A1* | 1/2008 | Wu et al. | 709/231 |

FOREIGN PATENT DOCUMENTS

| WO | WO9941675 | 8/1999 |
| WO | WO0124378 | 4/2001 |

OTHER PUBLICATIONS

Fielding R., Gettys J., Modul J. C., Frystyk G. Masinter L., Leach P., Berners-Lee T., "Hyper-text Transfer Protocol—HTTP 1.1," RFC 2616, Jun. 1999.

UPnP Content Directory Service Content Directory: 1 Service Template Version 1.01 for Universal Plug and Play Version 1.0, Jun. 25, 2002.

(Continued)

*Primary Examiner*—Rupal D Dharia
*Assistant Examiner*—Marcus McKenzie
(74) *Attorney, Agent, or Firm*—Krieger Intellectual Property, Inc.; Scott C. Krieger

(57) ABSTRACT

Elements of the present invention relate to systems and methods for controlling the transmission rate of streaming processes.

27 Claims, 1 Drawing Sheet

OTHER PUBLICATIONS

Figure 1:
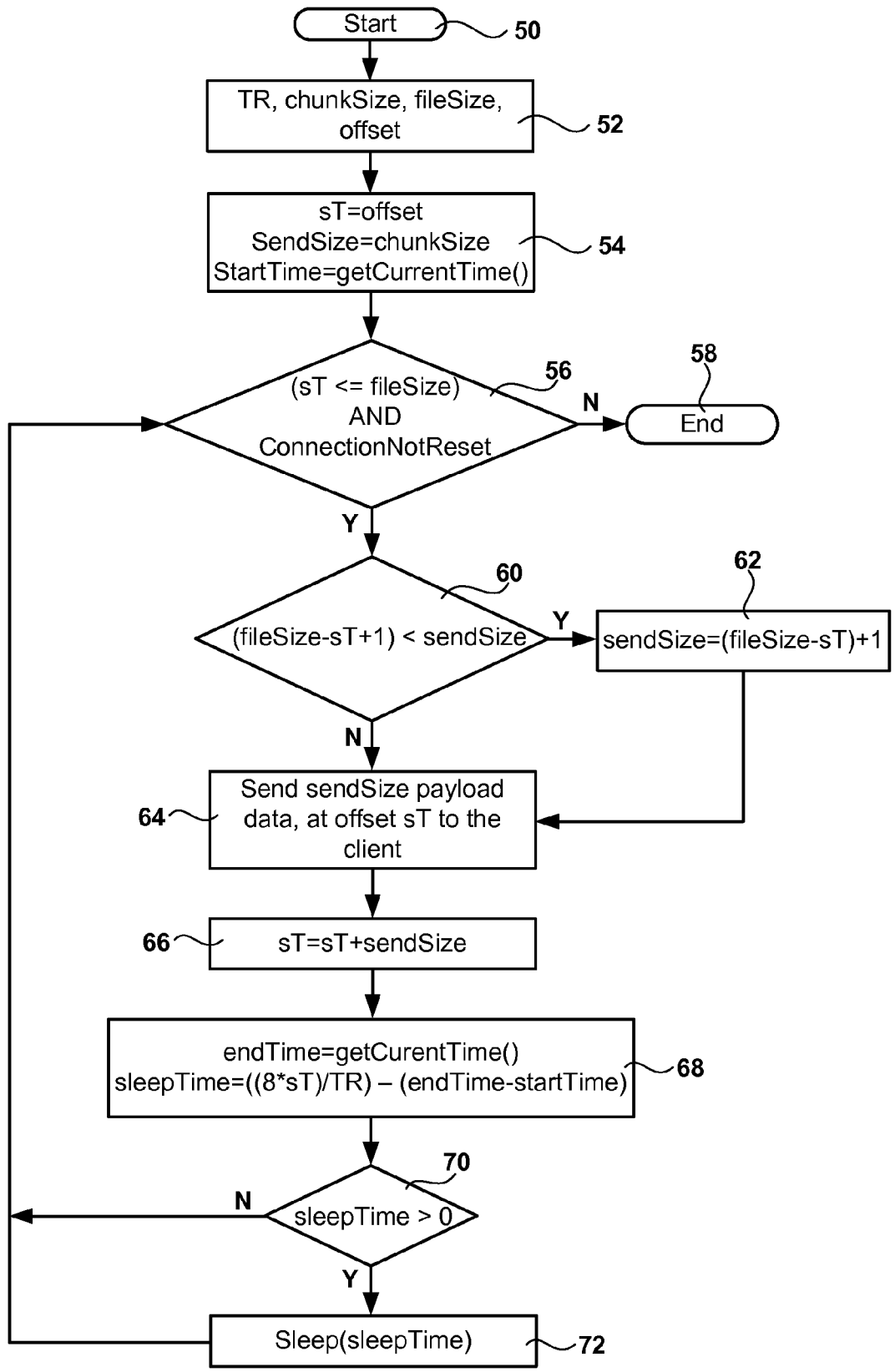

H. Schulzrinne, S. Casner, R. Frederick, V. Jacobson, "RTP: A Transport Protocol for Real-Time Applications", IETF RCF 1889, Jan. 1996.

H. Schulzrinne, A. Rao, R. Lanphier, "Real Time Streaming Protocol (RTSP)", IETF RFC 2326, Real Time Streaming Protocol (RTSP), Apr. 1998.

M. Handley, V. Jacobson, "SDP: Session Description Protocol", IETF RFC 2327, Apr. 1998.

Real Networks web site: http://www.realnetworks.com Accessed on Apr. 13, 2003.

Windows Media Player Website: http://microsoft.com/windows/windowsmedia/ Accessed on Apr. 13, 2003.

* cited by examiner

METHODS AND SYSTEMS FOR HTTP STREAMING USING SERVER-SIDE PACING

RELATED REFERENCES

This application claims the benefit of U.S. Provisional Patent Application No. 60/865,150, entitled "Methods and Systems for HTTP Streaming," filed on Nov. 9, 2006 and which is hereby incorporated herein by reference.

BACKGROUND

Hypertext Transfer Protocol (HTTP) Streaming refers to the process of using HTTP for streaming media. HTTP runs on top of Transmission Control Protocol/Internet Protocol (TCP/IP) and was not designed for streaming media (audio/video) which has a continuous time base. In general Real Time Streaming Protocol (RTSP) together with Real-time Transport Protocol (RTP) is better suited for streaming media. One of the main differences between HTTP and RTP protocols is the entity that controls the data transfer rate:

HTTP: HTTP is a pull protocol. Data transfer rate is controlled from the client side when using HTTP. HTTP runs on top of TCP/IP, which has its own congestion control/flow control mechanism. This configuration results in an HTTP stream being sent from the server to the client at the available bandwidth.

RTP: (RTP) is a push protocol used for streaming media data. Thus, in the case of streaming media using RTP, the server controls the flow and rate of data transfer. Typically the server sends the data at the bitrate of the media stream.

In spite of the superiority of the RTSP/RTP protocols for streaming media, HTTP protocol is often used for streaming media data. Traditionally on the Internet, a user who wants to serve streaming media content has easy access to an HTTP server, however, RTP/RTSP servers are not as ubiquitous as HTTP servers. Also, in earlier days, the main mechanism for client connectivity to the Internet for the majority of the users was through a modem. Modems typically supported network speeds of 14/28/56 Kbps. The behavior of HTTP protocol in situations where the available client bandwidth is limited, such as with traditional telephone-line modems, is acceptable for streaming media with bit-rates comparable to the available client bandwidth. As an example a RealAudio stream of 20 Kbps can be streamed reasonably well using HTTP protocol for a client with 28.8 Kbps modem.

With the proliferation of broadband connections to the Internet and high-speed wired/wireless home networks, HTTP streaming, as used currently, has some problems. Let us consider a WiFi 802.11b home network, which can support bandwidths ranging from 1 Mbps to 11 Mbps. Let us consider the case of using HTTP streaming for streaming MP3 audio. The MP3 bit-rates can range from 32 Kbps to 320 Kbps. If HTTP streaming is used to stream the MP3 audio, then typically the HTTP client will end up pulling the data from the HTTP server at a rate much faster than the actual MP3 song bitrate.

The currently existing HTTP streaming clients use one of the following two approaches:

Approach 1: The HTTP client pulls data from the HTTP server at its available client bandwidth. The client media player buffers the data as it arrives. The buffered data is used for playback at the correct playback speed, which is equal to the actual media bitrate.

Approach 2: The HTTP client uses the TCP receive window as a parameter to do the flow control which can throttle the speed of transmission. The TCP sending side stack can have, at any time, several unacknowledged segments sent on the network before it stops and waits for the receiver to acknowledge the first segment. The TCP sender has a knowledge about the TCP receiver's "receive window size" which is the amount of available space in the receiving side buffer for this TCP connection. Using its knowledge about the receive window size and number of unacknowledged bytes sent, the sender stack stops sending data when it calculates that the receiver buffer is full. The receiver updates its receive window size field with each ACK sent back. When the sender sees that the receiver stack has free buffer space available it will again start sending the data.

Thus some HTTP streaming clients let the receive side buffer be filled using the available client bandwidth, but read the data (e.g. using recv( ) socket function) in the client application periodically based on the set client bandwidth preference. RealOne player with the preference "Connection Bandwidth" set to a lower number than the actual available bandwidth behaves this way.

Both of the above approaches have the following drawbacks:

The first approach can require a very large client side buffer if the available network bandwidth is much larger that the actual media bitrate.

The second approach relies on TCP flow control to achieve streaming. This approach can perform poorly. This is because:

Pause functionality cannot be efficiently supported without data transfer on the network or an additional proprietary protocol on top of HTTP. This is because the client can not indefinitely set its receive window size to zero to pause the TCP stream. If this is done the server side application will start returning non-success on send operations once the sender side TCP stack reaches its TCP send buffer size for this TCP connection. After a certain number of unsuccessful send( ) function calls the server application is likely to abort this connection. Thus the HTTP client will typically continue to receive the stream and buffer the stream while the user has paused the stream. Pause functionality is important for streaming media.

Exact behavior and performance of this approach is dependent on the particular TCP algorithm implemented by the client side For example the TCP on the client side may be TCP Reno/Tahoe/Vegas or other TCP variations like Delayed ACK algorithm, Fast Recovery algorithm, etc., all of which behave differently.

Exact behavior and performance of this approach is also dependent on the particular TCP stack implementation. This includes various parameters like buffer space available, etc., which are especially important for an embedded device acting as a client.

Relying on TCP receive window size to do rate control for streaming media could result in silly window syndrome. Silly window syndrome results in the receiving side stack sending several ACKs with small windows size updates back to the sender. This can result in the sender sending small TCP segments as the receive window space becomes available. This is typically detrimental to network performance in general.

Some receiving side TCP stacks, especially for embedded systems may not support setting the receive buffer size programmatically (typically setsockopt function with SO_RCVBUF option). The TCP stack will still perform the flow control as before but if the maximum receive window size is small, performance will suffer further and the network overhead will be larger.

The use of Approach 2 results in frequent congestion, which requires the client to stop playback and buffer the stream before starting the playback again, resulting in a poor user experience.

SUMMARY

Some embodiments of the present invention comprise methods and systems for measuring and regulating the transmission rate of a bitstream with server-side control. Some embodiments comprise client-controlled pause functionality for streaming operations.

BRIEF DESCRIPTION OF THE SEVERAL DRAWINGS

FIG. 1 is a chart showing methods of exemplary embodiments of the present invention comprising transmission rate control.

DETAILED DESCRIPTION OF EXEMPLARY EMBODIMENTS

It will be readily understood that the components of the present invention, as generally described herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention comprise methods and systems for pacing the transmission of streaming media data from an HTTP server. In these embodiments, the HTTP server may be caused to stream the data at a near-constant target bit-rate. In some embodiments, the pacing of the transmission can be controlled based on the available client buffer size. Some embodiments support stream pause and seek functionality. In some embodiments, the inventive function may be implemented by modifying the HTTP server code to support pacing the transmission. Alternative embodiments can be implemented with ASP/ASP .NET/JSP/CGI or other server-side technologies in such a way that no change is required to the HTTP server code.

Embodiments of the present invention may provide an HTTP streaming solution for the case where modification of the HTTP server side is possible, but modification of the HTTP client side is impossible or less desirable. In some embodiments, the HTTP client may only need to send a single HTTP request to the HTTP server. Some embodiments may also provide a novel Pause and Seek function.

The following document is incorporated herein by reference as background material:

Fielding R., Gettys J., Mogul J. C., Frystyk H., Masinter L., Leach P., Berners-Lee T., "Hyper-text Transfer Protocol—HTTP 1.1," RFC 2616, June 1999

Some embodiments of the present invention may be implemented using a server-side script for pacing the transmission of HTTP streaming media data. Some embodiments of the present invention may be implemented by modifying the HTTP server-side server (code) to support pacing the transmission. In an exemplary embodiment, Active Server Pages (ASP), Microsoft's server-side script engine for dynamically-generated web pages, may be used. In alternative embodiments, other server-side technology can be used instead of ASP.

In an exemplary ASP embodiment, the client may send an HTTP GET request to a server-side script. The client request may comprise the URL or other identifier of the streaming media. Optionally, in some embodiments, the client request may include one or more of the following:

Starting byte offset (for supporting Pause functionality) (O=offset)

Client buffer size (D)

Target rate of transmission (TR)

Maximum client bandwidth (M)

In these embodiments, the server script may extract the URL of the streaming media requested by the client. The server may then determine the target transmission rate (TR) of the media. This can be done by any one or a combination of the following approaches:

The client can send a "Target rate of transmission" (TR) parameter in its request. In this case, the client has obtained the information about the streaming media bitrate and duration by any of the following methods or by other methods:

UPnP Content Directory Service (CDS) res element, bitrate attribute gives bitrate in bytes/sec for the resource, and duration attribute gives duration of the playback for the resource SDP Media attribute (a) parameter can provide the bitrate and the duration of the media.

The media payload data may have some information about the bitrate and the duration of the media stream.

In some embodiments, the client can send its request with TR parameter equal to the streaming media bitrate (R). Alternatively, in some embodiments, the client can send a request with the target transmission rate set to a higher value than the streaming media bitrate, based on its available buffer size (D) and the total duration of the media stream (T).

In some embodiments, the server script can find the bitrate (R) and the total duration (T) of the streaming media by extracting this information from the streaming media file, or using any of the above approaches. If the client has not sent any "Client buffer size" parameter, the server script may set its target rate of transmission (TR) equal to the streaming media bitrate (R). If the information about Client buffer size (D) and the offset (O) is available then the server script may choose to set the target rate (in bits per second) to $=TR=\min(M,(1+((R*T/8)-O)/D))*R)$, where R is the bit-rate of the streaming media, T is the total duration of the streaming media in seconds, D is the client buffer size in bytes, O is the offset in bytes (for the streaming media file) position starting where the transmission is requested, and M is the maximum client bandwidth. In some embodiments, the value of O can be set to zero if it is not available. In other embodiments the target rate TR may be determined as a function of media bitrate, R and current amount of data in the client buffer as estimated by the server. The estimation could be done by the server simulating the client buffer and media playout behavior.

The server may send an HTTP/1.1 200 OK response. The server may choose to set Content-Length field to the value equal to the (size of the streaming media file-offset O). Or, in some embodiments, the server may set the Transfer-Encoding: chunked. The server then paces the transmission of the streaming media payload data, to meet the target rate of transmission (TR). In some embodiments, this can be done by the server-side script using the algorithm explained below as a pseudo-code.

```
<input parameters: TR, chunkSize, fileSize, offset>
sT=offset
sendSize=chunkSize
startTime= getCurrentTime( )
Do While (sT <= fileSize) AND (ConnectionNotReset)
        sendSize=chunkSize
        if (fileSize-sT+1) < sendSize then
            sendSize=(fileSize-sT)+1
        end if
        send sendSize payload data, at offset sT to the client
        sT=sT+sendSize
        endTime= getCurrentTime( )
        sleepTime=((8*sT)/TR) – (endTime-startTime)
        if(sleepTime>0)
            Sleep(sleepTime)
        end if
Loop
```

In some embodiments, the parameter chunkSize is chosen less than the Client buffer size (D) (if known).

In an alternative embodiment, the server can drop parts of the stream data to support real-time stream delivery, if the stream transmission is observed to lag behind on the timeline. In another alternative embodiment, the server can increase/decrease the transmission rate of the stream data to support real-time stream delivery if the stream transmission is observed to lag/lead on the timeline.

Some exemplary embodiments of the present invention may be described with reference to FIG. 1. In these embodiments, a rate control process commences 50 and a target rate of transmission, TR is determined 52. A chunkSize, filesize and file offset may also be determined 52. In some embodiments, these data variables may be received from a client.

Transmission variables may then be set 54. A start transmission variable, sT, may be set to the offset location. The size of the data portion being transmitted, a sendSize variable, may be set to the chunkSize. Also, the method may determine a start time. These methods may then determine if the start transmission variable, sT is less than or equal to the file size and determine whether the connection has not been reset 56. If either or both of these conditions are false, the process may terminate 58. If both of the conditions are true, the process may determine if the remaining file portion is smaller than the sendSize 60. If the remaining file size is smaller, the sendSize may be reset to the size of the remaining file portion 62. In some embodiments, the remaining file portion may be determined by subtracting the start transmission location, sT, from the filesize and adding 1. A portion of the file beginning at the start transmission variable location and with a size equal to the sendSize variable may then be transmitted 64.

After this transmission, the sT variable may be reset to the location at the end of the just-transmitted data 66. In some embodiments, this may be performed by setting the start transmission variable to a value equal to the previous start transmission variable plus the sendSize variable. The end time of the transmission may also be ascertained 68 and a sleepTime may be calculated based on this end time. In some embodiments, the sleepTime may be determined by dividing the amount of data sent by the target transmission rate to find a target transmission time and then subtracting the actual transmission time from the target transmission time 68. In some embodiments, the sleepTime may be determined by multiplying the number of bytes transmitted by 8 to determine the number of bits transmitted and by dividing this product by the target transmission rate in bits per second to arrive at a target transmission time. The actual transmission time may then be subtracted from this target transmission time to get the sleepTime variable.

When the sleepTime variable is greater than zero 70, the process may enter a sleep state for an appropriate period, e.g., the value of the sleepTime variable 72. When the sleepTime variable is no greater than zero 70, the sleep state may be omitted and the process may return to another iteration at location 56.

In these exemplary embodiments, the client receives the payload data streamed by the server. The client then buffers the received payload data and plays it back at the correct playback speed.

To support the Pause functionality:
The client keeps track of the bytes played back so far for the streaming media, from the start of the media stream.
If the user requests Pausing the streaming media, the client notes the byte position of the last media data played back.
The client resets the underlying TCP (and thus HTTP connection)
When the user removes the pause and wants playback to be started, the client sends the request to the server with setting the Starting byte offset (O=offset) parameter to equal to the byte position value saved when the Pause was requested.
The client starts playing back the received data. Because typically the streaming video data has a structure where the decoder can start decoding only from an Intra (I) coded frame, the client may keep track of the byte position of the last Intra frame played back and use that as the value of the offset parameter in the request. Alternatively, in some embodiments, the client may just discard the data received until it encounters an I frame, where it can start decoding and playing back the data.

The Stop functionality may be supported by the client resetting the TCP (and thus the HTTP connection) and not storing the last played back byte position.

Simple seek functionality can also be supported by the client counting the offset of the byte based on the knowledge about total file size and the total duration for the streaming media file and the seek position (from some kind of user interface). This calculated offset will be sent in the request to the server script after resetting any currently existing HTTP connection. The payload data received can be decoded and displayed/played back after possibly waiting and discarding data until an Intra coded frame/payload is received.

In an implementation of an exemplary embodiment, an ASP script was implemented and kept on a Web Server. The target transmission rate was set to 160 Kbps. The step of determining the file-size of the streaming media was done separately. A Real Audio file was used for the HTTP streaming. A Real Networks RealOne Player was used as the client for the HTTP streaming. Network trace data was obtained to measure the streaming performance of this embodiment across the public Internet.

The exemplary embodiment was able to pace the transmission to achieve HTTP streaming at a near constant target transmission rate. A little variation (a few peaks) was seen in the plot around the constant target rate line. These occurred due to the fact that this exemplary embodiment tries to compensate for any back-log of data to be transmitted to meet the constant overall rate. The total time taken for streaming using our pacing of transmission is 41.44 seconds. The time it should have taken theoretically with constant transmission rate is (810041 bytes/20000 bytes per second)=40.50 seconds. Considering our streaming was done over a public Internet, the performance achieved by this embodiment is very close to optimal.

When the same streaming media file is streamed from a standard HTTP server without the server-side pacing of the present invention. The client pulls the streaming media data at its available client bandwidth, which fluctuates widely, and the entire song is transmitted in just 1.79 seconds, which would require a large client side buffer.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for regulating the rate of data transmission for a streaming media data file over a connection, said method comprising:
   a) determining a target transmission rate, wherein said target transmission rate is calculated using the equation: $TR=\min(M,(1+((R*T/8)-O)/D))*R)$, where M is the maximum client bandwidth, R is the bit-rate of said streaming media data file, T is the total duration of the streaming media in seconds, D is a client buffer size in bytes and O is the offset in bytes position starting where the transmission is requested (for the streaming media data file) and wherein said determining a target transmission rate is performed by a processor and a memory;
   b) determining a media file size;
   c) determining a file offset location;
   d) determining a data chunk size;
   e) setting a start transmission variable to said offset location;
   f) setting a data transmission size, sendSize, to said chunk size;
   g) determining a transmission start time;
   h) determining whether the start transmission variable is less than or equal to the file size;
   i) determining whether the connection has not been reset;
   j) if both conditions h) and i) are true, determining whether a remaining untransmitted file portion is smaller than said sendSize;
   k) if condition j) is true, setting said sendSize to the size of said untransmitted file portion;
   l) transmitting part of said data file, wherein said part begins at said start transmission variable and has a size equal to said sendSize variable;
   m) determining a transmission end time;
   n) resetting said start transmission variable to a location corresponding to its previous value plus said sendSize value;
   o) calculating a sleep time by dividing said start transmission variable by said target transmission rate to obtain a target transmission time and subtracting from this target transmission time the difference between the transmission end time and the transmission start time;
   p) if said sleep time is greater than zero, pausing said method for a period based on said sleep time and then resuming said method at step h); and
   q) if said sleep time is not greater than zero, resuming said method at step h).

2. A method as described in claim 1 further comprising dropping stream data parts to support real-time stream delivery if said sleep time is not greater than or equal to zero.

3. A method as described in claim 1 further comprising trans-rating stream data to a lower rate than current rate, R, to support real-time stream delivery if said sleep time is not greater than or equal to zero.

4. A method as described in claim 1 further comprising switching to a lower encoded stream rate than current rate, R, to support real-time stream delivery, if said lower encoded stream is available and if said sleep time is not greater than or equal to zero.

5. A method as described in claim 1 further comprising adjusting a stream data transmission rate to support real-time stream delivery if said sleep time is not equal to zero and if an actual transmission rate is observed to lag or lead said target transmission rate.

6. A method as described in claim 1 further comprising terminating said method if condition h) or condition i) is not true.

7. A method as described in claim 1 wherein said determining a target transmission rate comprises receiving target transmission rate data from a client message.

8. A method as described in claim 1 wherein said determining a media file size comprises receiving media file size data from a client message.

9. A method as described in claim 1 wherein said determining a file offset location comprises receiving file offset location data from a client message.

10. A method as described in claim 1 wherein said determining a data chunk size comprises receiving data chunk size data from a client message.

11. A method as described in claim 1 wherein said determining a target transmission rate comprises extracting target transmission rate data from said data file.

12. A method as described in claim 1 wherein said determining a media file size comprises extracting media file size data from said data file.

13. A method as described in claim 1 wherein said determining a file offset location comprises keeping track of last transmitted stream data location.

14. A method as described in claim 1 wherein said determining a data chunk size comprises determining chunk size data based on client buffer size, which may be known/estimated.

15. A method as described in claim 1 wherein said method is implemented on an HTTP server.

16. A method as described in claim 1 wherein said method is implemented on an HTTP server as a server side script.

17. A system for regulating the rate of data transmission for a data file over a connection, said system comprising:
   c) a target transmission rate determiner for determining a target transmission rate, wherein said target transmission rate is calculated using the equation: $TR=\min(M,(1+((R*T/8)-O)/D))*R)$, where M is the maximum client bandwidth, R is the bit-rate of said streaming media data file, T is the total duration of the streaming media in seconds, D is a client buffer size in bytes and O is the offset in bytes position starting where the transmission is requested (for the streaming media data file) and wherein said target transmission rate determiner comprises a processor and a memory;
   d) a file size determiner for determining a media file size;
   e) an offset determiner for determining a file offset location;
   f) a chunk size determiner for determining a data chunk size;

g) a location setter for setting a start transmission variable to said offset location;
h) a size setter for setting a data transmission size, send-Size, to said chunk size;
i) a start time determiner for determining a transmission start time;
j) a size comparator for determining whether the start transmission variable is less than or equal to the file size;
k) a reset determiner for determining whether the connection has been reset;
l) a remainder determiner for determining whether a remaining untransmitted file portion is smaller than said sendSize, if both conditions h) and i) are true;
m) a first sendSize setter for setting said sendSize to the size of said untransmitted file portion, if condition j) is true;
n) a transmitter for transmitting part of said data file, wherein said part begins at said start transmission variable and has a size equal to said sendSize variable;
o) an end time determiner for determining a transmission end time;
p) a start transmission re-setter for resetting said start transmission variable to a location corresponding to its previous value plus said sendSize value;
q) a sleep time calculator for calculating a sleep time by dividing said start transmission variable by said target transmission rate to obtain a target transmission time and subtracting from this target transmission time the difference between the transmission end time and the transmission start time;
r) a pauser for pausing said method for a period based on said sleep time and then resuming said method at step h), if said sleep time is greater than zero; and
s) a pause bypasser for resuming said method at step h), if said sleep time is not greater than zero.

18. A system as described in claim 17 further comprising a dropper for dropping stream data parts to support real-time stream delivery if said sleep time is not greater than or equal to zero.

19. A system as described in claim 17 further comprising a trans-rater for trans-rating stream data to a lower rate than current rate, R, to support real-time stream delivery if said sleep time is not greater than or equal to zero.

20. A system as described in claim 17 further comprising a switcher for switching to a lower encoded stream rate than current rate, R, to support real-time stream delivery, if said lower encoded stream is available and if said sleep time is not greater than or equal to zero.

21. A system as described in claim 17 further comprising an adjuster for adjusting a stream data transmission rate to support real-time stream delivery if said sleep time is not equal to zero and if an actual transmission rate is observed to lag or lead said target transmission rate.

22. A system as described in claim 17 further comprising a terminator for terminating said method if condition h) or condition i) is not true.

23. A system as described in claim 17 wherein said determining a target transmission rate comprises receiving target transmission rate data from a client message.

24. A system as described in claim 17 wherein said determining a media file size comprises receiving media file size data from a client message.

25. A system as described in claim 17 wherein said determining a file offset location comprises receiving file offset location data from a client message.

26. A system as described in claim 17 wherein said determining a data chunk size comprises receiving data chunk size data from a client message.

27. A system as described in claim 17 wherein said method is implemented on an HTTP server as a server side script.

* * * * *